US007493273B1

(12) United States Patent
Devlin et al.

(10) Patent No.: US 7,493,273 B1
(45) Date of Patent: Feb. 17, 2009

(54) METHOD, MEDIUM, AND APPARATUS FOR IDENTIFYING SIMILAR AUCTIONS

(75) Inventors: Bryan Kerry Devlin, Los Altos, CA (US); Frederick Chun Bong Wong, Oakland, CA (US); Mark Hill, Los Altos, CA (US)

(73) Assignee: Earthtrax, Inc., San Diego, CA (US)

( * ) Notice: Subject to any disclaimer, the term of this patent is extended or adjusted under 35 U.S.C. 154(b) by 890 days.

(21) Appl. No.: 11/039,433

(22) Filed: Jan. 19, 2005

(51) Int. Cl.
G06Q 30/00 (2006.01)
G06F 17/30 (2006.01)
G07F 7/00 (2006.01)
(52) U.S. Cl. .......................................... 705/26; 705/27
(58) Field of Classification Search .................. 705/26, 705/27
See application file for complete search history.

(56) References Cited

U.S. PATENT DOCUMENTS

| 5,659,742 | A | * | 8/1997 | Beattie et al. ............ 707/104.1 |
| 5,987,457 | A | * | 11/1999 | Ballard ........................... 707/5 |
| 6,212,517 | B1 | * | 4/2001 | Sato et al. ....................... 707/5 |
| 6,785,669 | B1 | * | 8/2004 | Aggarwal et al. .............. 707/3 |
| 6,785,671 | B1 | * | 8/2004 | Bailey et al. ................... 707/3 |
| 7,054,860 | B2 | * | 5/2006 | Inaba et al. ..................... 707/5 |
| 7,200,587 | B2 | * | 4/2007 | Matsubayashi et al. ........ 707/3 |
| 7,330,826 | B1 | * | 2/2008 | Porat et al. ..................... 705/26 |
| 2003/0093338 | A1 | * | 5/2003 | Kim et al. ...................... 705/27 |

OTHER PUBLICATIONS

The Evolution of Web Searching, David Green Online Information Review, v24n2 p. 124-137, 2000.*

* cited by examiner

*Primary Examiner*—Jeffrey A. Smith
*Assistant Examiner*—Matthew Zimmerman
(74) *Attorney, Agent, or Firm*—Baker Botts L.L.P.

(57) ABSTRACT

Methods, apparatuses and systems directed to the identification of a set of auctions which are similar, or relevant, to a contemplated or model auction. In one embodiment, the similar auction identification system uses a model auction, including keywords and other information contained in a data structure that characterize attributes of the auction, as input data to identify a set of auctions that are similar or analytically relevant to the model auction. In one implementation, the resulting set of identified auctions allows a user to efficiently analyze the auctions in assessing the starting parameters of a contemplated auction, or for assessing the latest bid price in a currently pending auction. In one implementation, the set of identified auctions can be used as an input to an auction optimization system that, for example, computes a set of suggested auction parameters for a contemplated auction, and/or computes one or more predicted behavioral attributes for a contemplated auction.

22 Claims, 10 Drawing Sheets

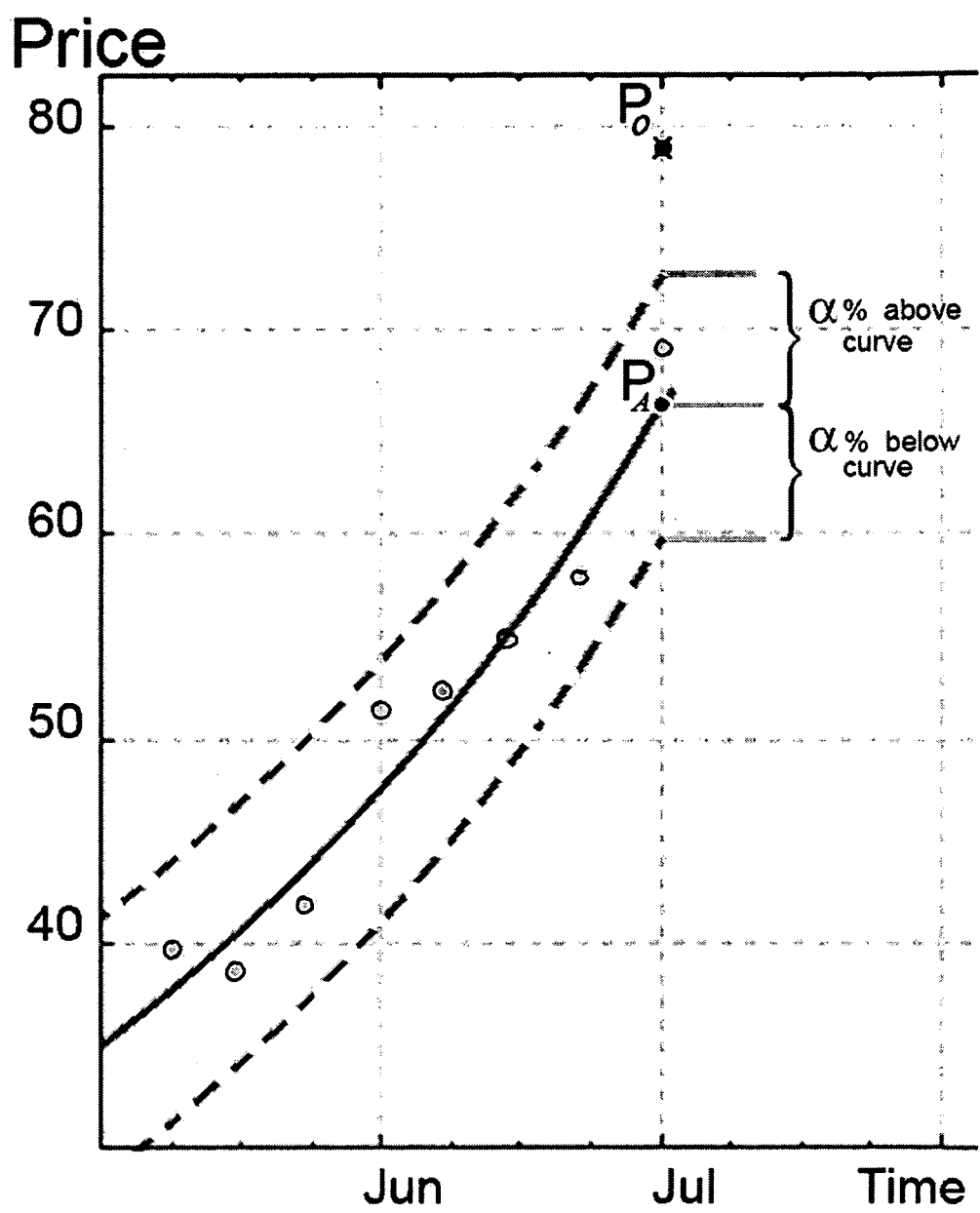
Fig._10

METHOD, MEDIUM, AND APPARATUS FOR IDENTIFYING SIMILAR AUCTIONS

CROSS-REFERENCE TO RELATED APPLICATIONS

This application makes reference to the following commonly owned U.S. patent applications and patents, which are incorporated herein by reference in their entirety for all purposes:

U.S. patent application Ser. No. 10/646,096 in the name of Bryan Devlin and Mark Hill, and entitled "Auction Optimization System;" and U.S. patent application Ser. No. 10/878,261 in the name of Bryan Devlin and entitled "Auction Optimization System."

FIELD OF THE INVENTION

The present invention relates to auctions and, more particularly, to methods, apparatuses and systems facilitating the identification of auctions that are similar to a model or contemplated auction. Embodiments of the present invention are especially adapted to creating a working database of auction histories for items similar to those of a contemplated auction.

BACKGROUND OF THE INVENTION

On-line transaction and auctions systems are known. For example, eBay.com of San Jose, Calif. hosts an enormously popular on-line auction facility allowing users to auction and buy a wide variety of items, such as automobiles, electronics and services. Of course, there are a vast array of on-line auction facilities, some of which are highly specialized to a particular category, such as firearms, automobiles, and the like. To facilitate and promote their use, such on-line auction facilities offer tools and functionality to assist the user. For example, on-line auction facilities post buying and selling tips, as well as generalized descriptions of the on-line auction process and available options, such as reserve and "buy-it-now" prices. On-line auction facilities also offer tools that facilitate tracking and management of items being sold by a particular user.

Often times, it is useful for users desiring to post an item for auction to search for and analyze similar auctions. Furthermore, U.S. patent application Ser. Nos. 10/646,096 and 10/878,261 teach that users wishing to sell an item can benefit greatly from an analysis of the history of the selling prices, and other auction attributes, of similar items in the past. Yet, the on-line auction facilities generally offer very limited means of identifying auctions of items which are similar or identical to that of a contemplated auction. There is a need for generating that history by finding other auctions with a reasonably high probability of being a "similar" item.

On-line auction facilities generally offer a "keyword match" form of searching, wherein a "search engine" applies user-supplied keywords to search the on-line auction facility's database. Each auction item has a set of keywords assigned to it, some assigned by the auction facility but most assigned by the seller. The search engines use these keywords to perform an absolute match search (sometimes called match-all search) from their databases to retrieve a list of relevant objects. For example in FIG. 4, if the user enters the keywords "X", "Y", and "Z", the search engine will return the objects that are in the tight triangle-like region labeled "X+Y+Z".

There are keyword search engines that employed variants of this absolute keyword-search technique: 1) Regular expressions are used in conjunction with the keywords. For example, in FIG. 4, if the user enters "X" AND ("Y" OR "Z"), the keyword search engines will return the objects in the regions labeled "X+Y", "X+Z", and "X+Y+Z"; and 2) Keyword auto-correction. Some search engines take into consideration that the keywords entered by the users or being listed with the objects might be misspelled. The keyword auto-correction technique allows search engines to lookup similar keywords that resemble the spelling of these keywords and ask users to correct the searches.

Both techniques are used extensively and are very useful. However, there are two key issues that they cannot address:

1) The keywords are collections of phrases or words. Some of these phrases or words are perfectly substitutable for each other. For example, "phone" is equivalent to "telephone" in English. Similarly, a mobile phone might be called a "cell phone" or "cellular phone" or "hand phone" or "wireless telephone". A search engine should identify all these as "the same object" or "similar objects" despite the different keywords. This is especially problematic for an Internet auction, wherein the keywords are largely entered by the sellers, who may or may not include all relevant keywords. The burden of locating these items is thus shifted to the buyers searching for them.

2) Sellers of auction objects take advantage of the absolute keyword search mechanism, and inject many irrelevant keywords in the descriptions of the items, so that the objects will be more readily found. These keywords are often irrelevant to the items, but rather are related to the auction facility's item categories. The incentive for a seller to engage in this practice is especially great because many potential buyers rely on the search engines to find items they wish to buy.

Because of the aforesaid problems associated with prior art keyword search mechanisms, it is difficult or impossible in current online auction facilities to efficiently identify a set of auctions that are similar, or otherwise relevant, to a contemplated or model auction. Furthermore, there is additional information maintained about auction items which could also be used to add precision to the search method: the seller's name or ID, the prices of past auctions, the auction facility's item categories, UPC codes, and more.

In light of the foregoing, a need in the art exists for methods, apparatuses and systems that facilitate the identification of a set of auctions which are similar to a contemplated auction. Embodiments of the present invention substantially fulfill this need.

SUMMARY OF THE INVENTION

The present invention provides methods, apparatuses and systems directed to the identification of a set of auctions which are similar, or relevant, to a contemplated or model auction. In one embodiment, the similar auction identification system uses a model auction, including keywords and other information contained in a data structure that characterize attributes of the auction, as input data to identify a set of auctions that are similar or analytically relevant to the model auction. In one implementation, the resulting set of identified auctions allows a user to efficiently analyze the auctions in assessing the starting parameters of a contemplated auction, or for assessing the latest bid price in a currently pending auction. In one implementation, the set of identified auctions can be used as an input to an auction optimization system that, for example, computes a set of suggested auction parameters for a contemplated auction, and/or computes one or more predicted behavioral attributes for a contemplated auction.

DESCRIPTION OF THE DRAWINGS

FIG. 10 is a graph illustrating the comparison of a weighted final auction price corresponding to a given auction to the graph of FIG. 9.

DETAILED DESCRIPTION OF PREFERRED EMBODIMENT(S)

A. Operating Principles

As discussed in more detail below, the similar auction identification system 40, in one implementation, uses a variety of computed values to construct a score for a candidate auction, where the score indicates the likelihood that the auction is similar or analytically relevant to a model auction. A model auction is provided (usually by the user), and the result of the search is a set of auctions similar to the model auction. The similar auction identification system 40, according to implementations of the present invention, operates to retrieve a set of auctions using the keyword search mechanism supported by a search engine, and then narrows the set of retrieved auctions down to those that are similar, as discussed more fully herein, based on one or more similarity criterion. In one implementation, a user specifies keywords that are used to gather an initial set of auctions matching the keywords. In one implementation, the user can select one or more of the auctions in the initial set as a model auction against which the remaining auctions are compared for similarity. In one implementation, a model auction comprises a set of attributes describing a contemplated auction of an item, service or other object. In another implementation, the model auction can be created by the user based on the attributes of an auction a user is contemplating. In other implementations, the user can select an auction from the initial set of auctions generated by keyword searching, and modify one or more attributes in the selected auction as desired to create a model auction.

In one embodiment, the similar auction identification system 40 uses a set of keywords derived from the user's input to query an auction facility's search engine to search a database of auctions and to create a set of candidate auctions which it then evaluates further according to the methods detailed herein. In another embodiment, the similar auction identification system 40 maintains its own database of completed auctions, derived from past users' searches, querying the auction facility's search engine using its published interfaces, or other techniques which may be supported by the auction facility. In the latter embodiment, the similar auction identification system 40 implements its own search engine and queries it to create the set of candidate auctions. In other implementations, similar auction identification system 40 may query multiple data stores associated with different on-line auction providers to generate a set of candidate auctions.

The similar auction identification system 40, in one implementation, evaluates each member of the auction set to compute an overall similarity score M, using computed values which may include, but are not limited to, one to all of the following: 1) a keyword-match probability T, 2) a seller-identification match value S, 3) a category match value C, 4) a price range match value P, and 5) a UPC code match value U.

Figure 2:
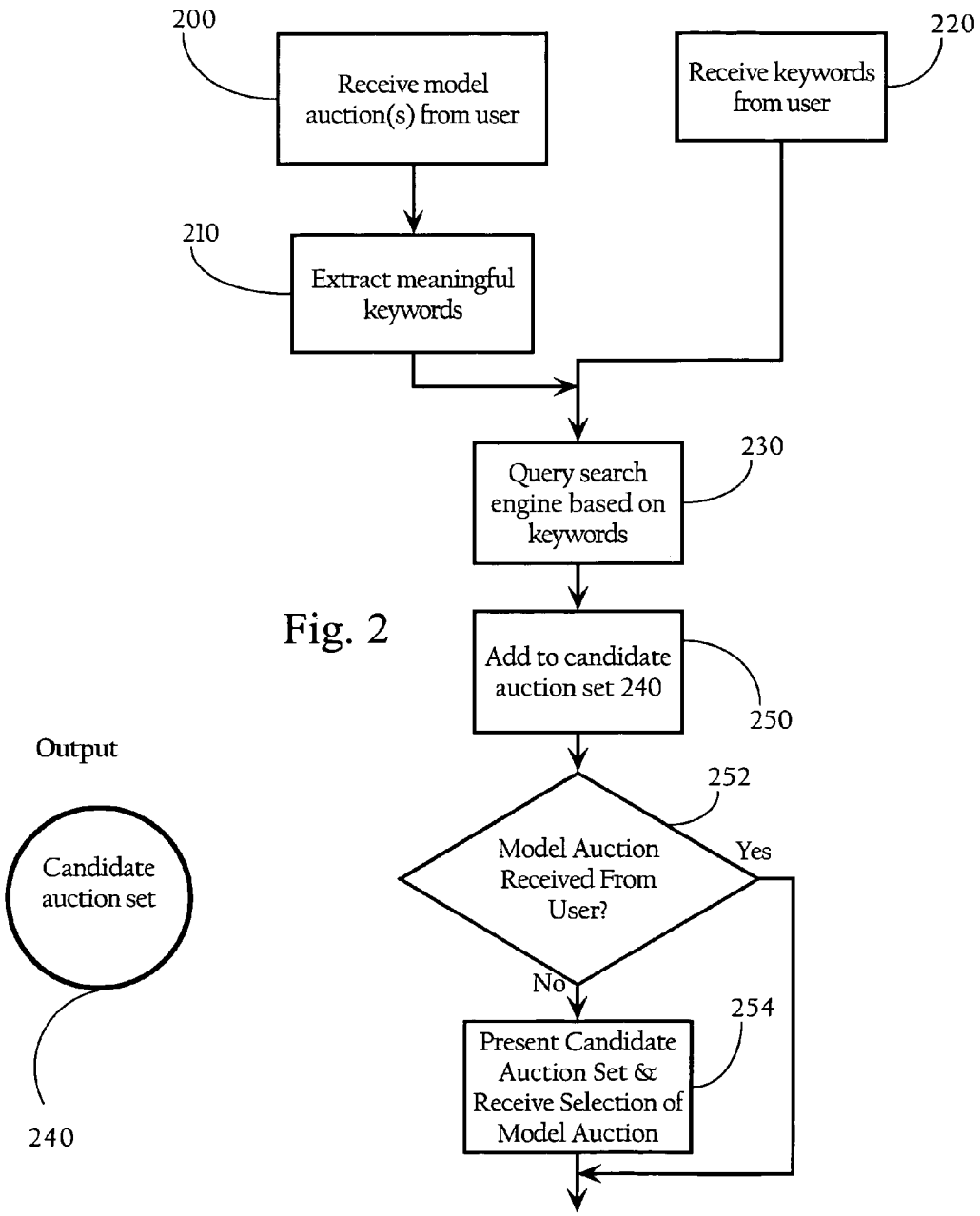
FIG. 2 is a flow chart diagram illustrating the first phase of the similar auction identification process, according to an implementation of the present invention.

FIG. 2 illustrates the initial overall process flow according to an implementation of the present invention. As FIG. 2 illustrates, a user either 1) directly accesses on-line auction facility 30 to search for and identify a model auction and provide it to similar auction identification system 40, or 2) may access similar auction identification system 40, which itself is a web-addressable resource, to specify one or more keywords and locate a pool of auctions containing those keywords and choose a model auction from the pool. For example, according to the former option, similar auction identification system 40, in one implementation, receives a model auction from a user 200, and extracts meaningful keywords from the model auction (210). In one implementation, the model auction may be described in a structured document, such as an HTML or XML document, which includes the attributes of the model auction, such as the title, description, seller identification, and the like. A user, for example, may save an HTML page (or a link) transmitted by on-line auction facility 30 and rendered on the browser of the user's computer 60 in a local hard drive. The user can then upload the HTML page describing the model auction to similar auction identification system 40. Of course, as discussed below, a variety of data gathering techniques can be used. Similar auction identification system 40 then operates on the uploaded file to extract one or more meaningful keywords (210).

According to the latter option, the user specifies one or more keywords (220), which are used to query a database of auctions (230). In one embodiment, the search engine identifies all auctions in the database that contain at least one keyword specified by the user. In another implementation, the search engine identifies the auctions in the database that contain all the keywords specified by the user. According to either embodiment, similar auction identification system 40 adds the identified auctions to a set of candidate auctions 240 (250). If the user has not already identified a model auction (252), similar auction identification system 40 presents the set of candidate auctions and receives a selection from the user (254). As discussed more fully below, similar auction identification system 40 then operates on the set of candidate auctions 240 to identify auctions that are analytically relevant or similar to the model auction.

Figure 3:
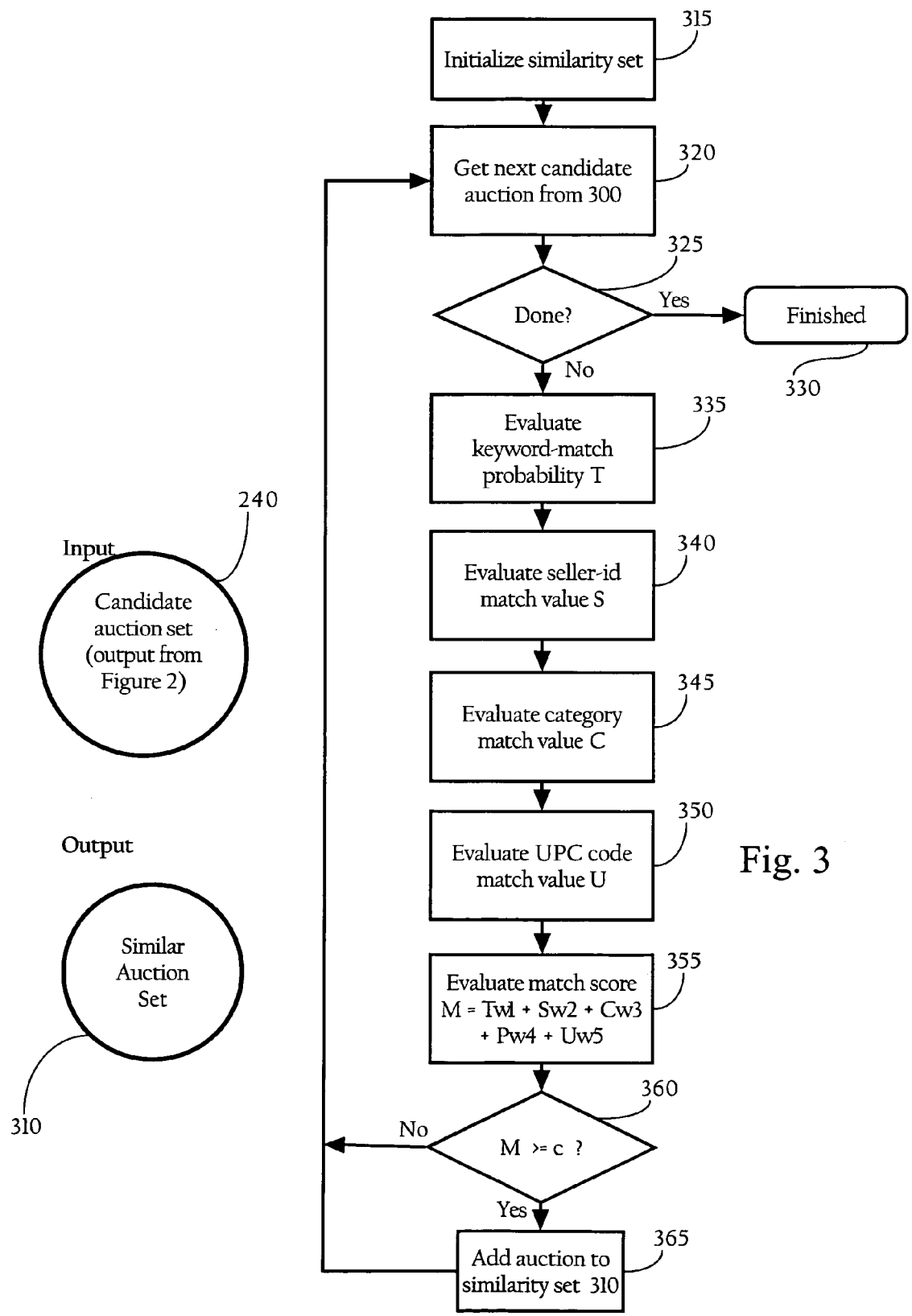
FIG. 3 is a flow chart diagram illustrating the second phase of the similar auction identification process, according to an implementation of the present invention.

As FIG. 3 illustrates, similar auction identification system 40, in one implementation, executes a series of functions that evaluate each auction in the set of candidate auctions 240 and provide a score. In one implementation, similar auction identification system 40 then weights each score, aggregates the weighted scores or values, and compares the weighted sum to a threshold value to determine whether a given auction is similar to the model auction. Other implementations are possible, for example, the individual comparison or evaluations functions discussed below can be performed in succession to gradually narrow the set of candidate auctions to the resulting similar auction set 310. In one implementation, the value or score computed by each function, in one implementation, is evaluated against a corresponding threshold.

As discussed above, similar auction identification system 40, in some implementations, can extract keywords from a model auction specified by a user. In a given auction, the title and description of the item are typically specified by the seller, although some auctions do not contain any description other than a photograph. The similar auction identification system 40, in one implementation, extracts meaningful keywords from the title and description. In addition, auction titles and descriptions typically contain one or more words that are not descriptively meaningful, e.g. articles ("a", "an", "the"), prepositions, etc. The present invention, in one implementation, extracts the meaningful keywords at step 210, as follows: If the description contains no meaningful keywords, the present invention, in one implementation, extracts the keywords from the titles. Otherwise, the similar auction identification system 40 extracts the keywords only from the descriptions. The rationale for this is that, if the keywords are found in the titles but not the descriptions, they are likely not representative keywords. Furthermore, similar auction identification system 40 then filters out articles, prepositions and other words that are not descriptively meaningful. In one implementation, filters the keywords against a list of words to be excluded. In one implementation, the exclusion list can be tailored to the item or service associated with the model auction; for example, exclusion lists can be tailored to automobiles, clothing, or more generally to auction categories.

A.1. Keyword-Matching Probability T

The similar auction identification system 40, in one implementation, evaluates the keyword-matching probability T of each member of the auction set, in the manner detailed herein.

A.1.a. Shortcomings of Keyword Searches

Because of known shortcomings of keyword searches when applied to auctions, the similar auction identification system 40 further processes the meaningful keywords extracted from each auction (335), as illustrated in FIG. 3. Two of the shortcomings of traditional keyword searches are:

1) A keyword search usually does not find all auctions that match a particular product. For example, a search for keywords "Printer", "HP", "4000" will not return auctions that only contain the keyword "HP4000"; and 2) A keyword search may often find auctions that, while relevant, do not correspond to the product or other auction item. For example, a search for keywords "Printer", "HP", and "4000" will return auctions that also contain the keyword "Toner," resulting in an initial auction set including auctions directed to printers and toners.

To address these shortcomings, similar auction identification system 40, in one implementation, calculates a keyword matching probability value, T, for each auction, based on two values for a keyword—the Distinctiveness Degree and the GeoWeight, which were developed based on observations from a large representative set of Internet auctions:

1) Distinctiveness Degree: The number of occurrences of a keyword in a set of items determines the importance of that keyword. For example, the keyword "Printer" is distinctive in the entire set of auctions, but not distinctive under the category "Computer/Printer".

2) GeoWeight: The location of the keyword in the description of the auction determines the importance of that keyword among the keywords of the auction. In one implementation, the similar auction identification system 40 addresses the situation where auction sellers include many keywords, not all of which are relevant to the subject auction. For example, a seller might include keywords such as "4M", "4500PS" in its description of an auction item as "This is an auction for HP Printer 4000. *description* . . . . We also sell HP 4M and 4500PS, etc printers as well". The keyword "4M", and "4500PS" are distinctive, but not relevant to the auction. In general, the positions of these irrelevant keywords are usually toward the end of the description. Implementations of the present invention use the positions of the keywords to calculate their GeoWeight.

A.1.b. Distinctiveness Degree

For didactic purposes, the following is a definition of terms used in computing the distinctiveness of keywords in a set of auctions, according to one implementation of the present invention:

1) M represents a set of auctions;

2) K represents a set of meaningful keywords derived from the user's input, extracted according to the method described earlier;

3) $K_i$ is an element in the keyword set K such that $K_i \epsilon K$;

4) A function $E(M,K_i)$ returns a set of auctions in M such that each returned auction contains the keyword $K_i$; and 5) A function $\phi(X)$ returns the total number of elements in the set X, except the empty set. For example, $\phi(M)$ will return a value of 5 if there are 5 auctions contained in M Given the foregoing terms and functions, the Distinctiveness Degree of a Keyword $K_i \epsilon K$ is:

$$D(Ki) = 1 - \frac{\phi(E(M, Ki))}{\phi(M)}$$

If $D(K_i) \rightarrow 1$, it implies that the keyword $K_i$ is distinctive among the auction set M. If $D(K_i) \rightarrow 0$, it implies that the keyword $K_i$ is not distinctive among the auction set M.

A.1.d. GeoWeight

Figure 5:
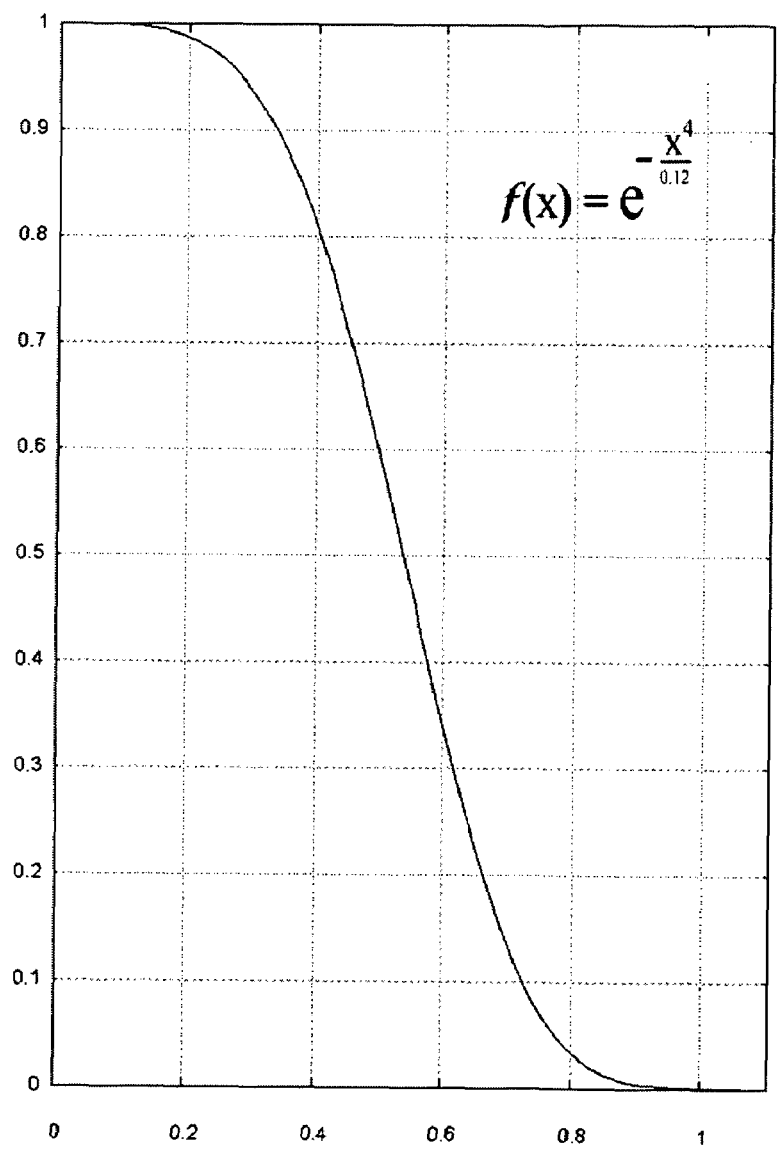
FIG. 5 is a mathematical graph illustrating a function used in the GeoWeight calculation, according to an implementation of the present invention.

For didactic purposes, the following is a definition of terms used in computing the GeoWeight of keywords in a set of auctions, according to one implementation of the present invention:

1) K represents a set of meaningful keywords derived from the user's input;

2) $K_i$ represents an element in the set K such that $K_i \epsilon K$;

3) M represents a set of auctions;

4) W represents the description of an auction $M_i \epsilon M$ where W has been reduced to its meaningful keywords, as described above;

5) N represents the total number of words in W;

6) A function $Position(W,K_i)$ returns the position of the first occurrence of keyword $K_i$ in W starting from the beginning position of W. The function, in one implementation, returns a zero value if the keyword $K_i$ is not found in W, 7) $F(x)$ is a 1-to-1 function represented by the graph in FIG. 5. It should be noted that f(x) can be any of a class of mathematical functions where x ranges from 0 to 1, f(x) ranges from 0 to 1, and f(0)=1 and f(x) decays very sharply to 0 as x approaches 1, the goal being to assign a much higher value to a keyword appearing earlier in the description. There are many functions which can be used here, as will be apparent to one skilled in the art, but one embodiment is as shown in FIG. 5.

Function: Given the foregoing terms and functions, according to one implementation of the invention, the Geo Weight of a Keyword $K_i \in K$ in an auction Mi is:

$$G(Ki) = f\left(\frac{\text{Position}(W, Ki)}{N}\right)$$

If $G(K_i) \rightarrow 1$, it implies the keyword is most likely relevant and appears at the beginning of the auction $M_i$'s description. If $G(K_i) \rightarrow 0$, it implies the keyword is most likely irrelevant and appears at the end of the auction $M_i$'s description.

A.1.e. Calculation of Keyword-Matching Probability

Figure 4:
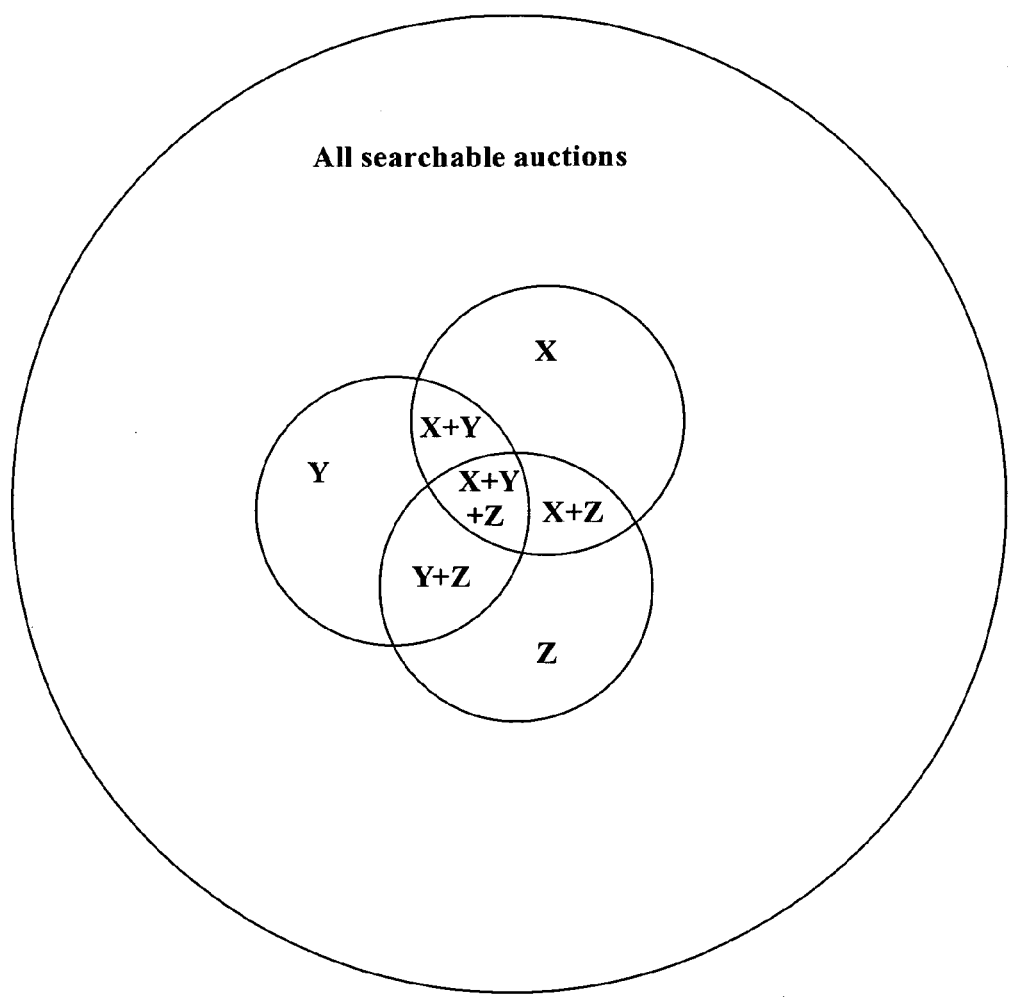
FIG. 4 is a Venn diagram illustrating search results when various combinations of keywords are entered.

For didactic purposes, the following is a definition of terms used in computing the keyword-matching probability T of an auction, according to one implementation of the present invention:

1) U represents a set of meaningful keywords derived from the user's input, extracted according to the method described earlier;

2) $U_i$ is a keyword in the set of keywords such that $U_i \in U$;

3) M is a subset of all searchable auctions in a database, and $M_i$ is an element in M such that $M_i$ contains at least one of the members of U (i.e. $U_i \in U$). For example, in FIG. 4, if the keywords entered by the user are "X", "Y" and "Z", then M is the area that is enclosed by the three inner circles "X", "Y", and "Z";

4) S represents a keyword set that is the union of all keywords listed in the auctions $M_i \in M$. In one implementation, all keywords in each auction may be filtered or extracted to eliminate words, such as "the", "a", etc., that are not able to descriptively meaningful (see above). Therefore, a keyword in S may or may not exist in U; and 5) D(k) and G(k) are the Distinctiveness Degree and Geo-Weight functions, respectively, described above.

Function: Given the foregoing, similar auction identification system 40, in one implementation, then determines the importance of the keywords (either entered by the user, or through extraction from the model auction, relative to the remaining keywords across all auction in the candidate set. The Keyword Matching Value of an Internet auction $Mi \in M$, in one implementation, is:

$$P(Mi) = \sum_{Ki \in U} D(Ki) * G(Ki) - \sum_{Ki \notin U \text{ and } Ki \in S} D(Ki) * G(Ki)$$

The Keyword Matching Value is normalized to the range from 0 to 1 as follows:

Let Span=Maximum(P(Mi))−Minimum(P(Mi)), $\forall Mi \in M$

Then, the Keyword Matching Probability, T, of an Internet auction $M_i \in M$ with user keywords U is:

$$T = \frac{P(M_i) + \text{Span}}{\text{Span}}$$

The values for T will range between 0 and 1. In one implementation, an auction is considered to be similar if the keyword matching probability value is greater than a threshold constant σ. In one embodiment, σ is 0.50. In other implementations, the keyword matching probability value T simply becomes a component score in an overall matching algorithm, as discussed below.

A.2. Seller-Id Match Value S

In embodiments where a model auction is chosen by the user from the initial pool of auctions, the seller identifications in the remaining auctions can be compared to the seller identification in the model auction. In one implementation, the similar auction identification system 40 of the present invention uses the seller's identification corresponding to auctions as one factor in the similarity computation, at 340 in FIG. 3. For example, in one implementation, the similar auction identification system 40 deems that two given auctions where the seller identifications are the same are more likely to be similar. Assuming that the other factors and constraints have placed these auctions as similar, sellers often sell multiple copies of the same type of item to maximize their revenue. Thus, the seller identification match value, S, contributes positively towards the overall score M of the auction if the seller-ids match. However, in one embodiment, if seller-ids do NOT match, the seller identification match value does not contribute negatively towards M, since many sellers may sell the same item and different seller-ids do not indicate that items are dissimilar. Thus, in one implementation, the seller identification match value can be computed according to the following: S=0 or 1, where 1 indicates a match, and 0 indicates no match.

A.3. Category Match Value C

In one implementation, the similar auction identification system 40 of the present invention uses the auction facility's category class corresponding to auctions as one factor in the similarity computation, at 345 in FIG. 3. All of the major on-line auction houses have many 'main-level' categories. For example, Yahoo® Auctions has 17 top level (main) categories, Amazon® Auctions has 20, and eBay® has 32 top level categories. For these three popular auction facilities, then, there are 23 top-level (main) categories on average.

The value C for an auction, in one implementation, contributes a small positive value towards the overall score M if the auction is in the same (main) category class as a model auction. In one implementation, it contributes a very large negative value if the auction is in a different category class from the model auction, because it is very rare that 2 truly similar auctions are listed under 2 different top-level category classes.

For example, the auction item of 'Diesel Kratt Jeans' would most likely be listed under the category.class of 'Clothing and Accessories' as a top-level (main) category heading, and not be listed under 'Automotive & Parts'. In light of the foregoing, in one implementation, the category class matching function, C can return or −1000 or 1 as values. A value of −1000 is given to auctions whose categories do not match, in order to bias the end result to "no match" regardless of the other terms in the equation. A value of 1 is given to contribute to the score M if the categories match. It will be apparent to one skilled in the art that any large negative value for "no match" could be used.

The category against which the auctions in the candidate pool are compared can be obtained in a variety of ways. For example, in one implementation, the category can be specified by the user from a list presented to him or her. In another implementation, the category can be obtained from the category assigned by the on-line auction facility to the model auction identified by the user. Still further, in one implementation, the auction categories can be mapped to uniform set of auction categories before performing the computation in implementations where auction data is retrieved from more than one on-line auction facility, where each auction facility maintains different category divisions.

A.4. Price Range Match Value P

Similar auction identification system 40, in one implementation, also compares the final bid price of each auction in the set of candidate auctions to the model auction. While slight differences in price are to be expected, and indeed, even large differences occur if items differ in age, condition, or other qualitative factors, a similarity in price adds to the likelihood that a candidate auction is similar.

Figure 9:
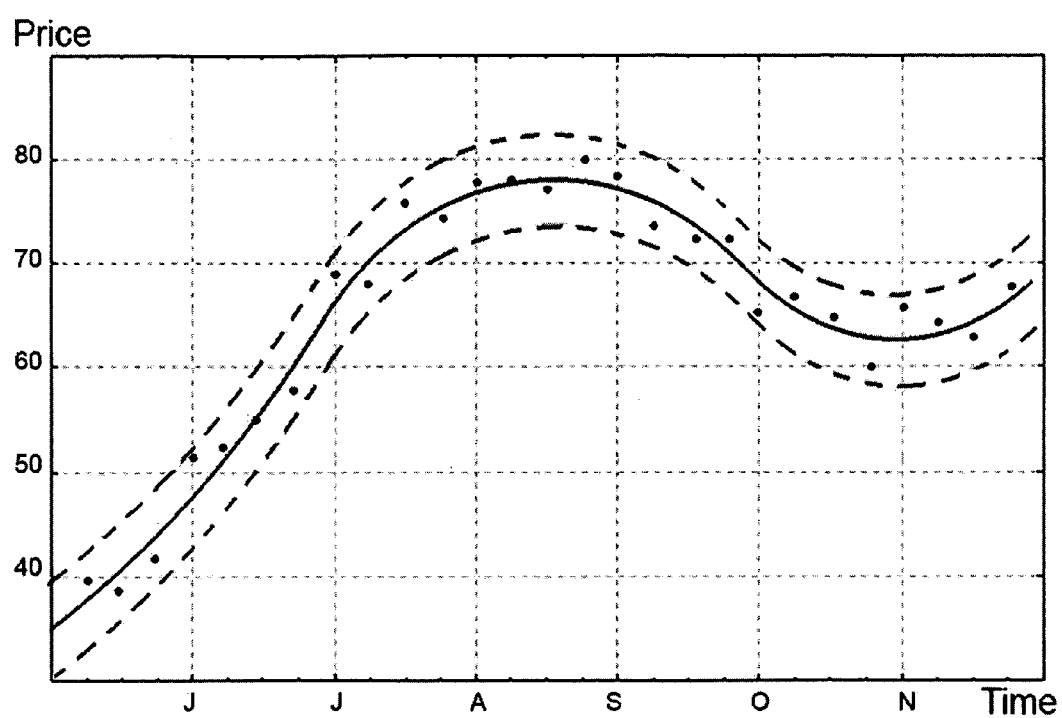
FIG. 9 is a graph of weighted average auction price versus time for a set of auctions.

In one implementation, similar auction identification system 40 computes a price match factor based on the final auction price of a given auction in the set of candidate auctions relative to the remaining candidate auctions. During the course of a year, the price of an item changes constantly. By using a spline formula, auction optimization system 40 can derive a smooth curve to form fit most of the points of the (weighted average) prices of the auctions in the candidate list. FIG. 9 graphically illustrates the application of a spline formula to the weighted average prices of each candidate auction in the set of auctions over May to December of a given year. In one implementation, all of the auctions in the candidate list are modeled. If the initial keyword match was particularly inaccurate, this calculation may not produce very meaningful results. In another implementation, auction optimization system 40 filters out auctions where the matching probability value T (above) is below a threshold value.

Referring to FIG. 9, the dots represent weighted average prices for an item during some estimated weekly period. U.S. application Ser. Nos. 10/646,096 and 10/878,261 disclose calculation of weighted average prices for different time intervals based on behavioral attributes of each auction. To smooth out these points, similar auction identification system 40 applies a spline formula (represented by the dark curve). The dashed curves, above and below the spline, represent an exact percentage (α%) above and below the spline curve, thus defining a boundary of "similar" auctions. FIG. 10 illustrates the comparison of the weighted price corresponding to a given auction (with a final auction price $P_o$) to the set of candidate auctions.

As FIG. 10 shows, similar auction identification system 40 compares the instant weighted auction price to the appropriate time period in the graph. That is, for the corresponding time period, similar auction identification system 40 determines whether the final auction price $P_o$ is within a threshold distance of the weighted average auction price $P_A$, calculated from the smoothed spline curve, in the same time period corresponding to the given auction. In one implementation, similarity is determined based on the following formula:

$P_o$ is similar to all other auctions in our candidate list, if $$\left(1 - \frac{\alpha}{100}\right) \cdot P_A \leq P_o \leq \left(1 + \frac{\alpha}{100}\right) \cdot P_A$$

If the auction fails the criteria, then the price match test fails. For the example graph of FIG. 10, $P_o$ fails the price match test, because it is not within the threshold range of the weighted average. In one implementation, an auction that fails the price match test is excluded from the similar auction set.

As discussed in more detail below, the price match value P can also be used as a weighted component of the overall matching score. In another implementation, however, the overall matching score for each auction can omit the price match comparison discussed herein. The resulting set of auctions can then be used in a second pass that includes the price match functions detailed above to further filter score the auctions. In one implementation, the contribution of the price match score is based on the distance from $P_A$. In one implementation, if $P_o$ is beyond the threshold distance from $P_A$, the similar auction identification system 40 assigns a large negative value to the price match score. In one implementation, the score approaches 1 as $P_o$ approaches $P_A$.

A.5. UPC Code Match Value U

In one implementation, the similar auction identification system 40 of the present invention uses the auction facility's UPC code corresponding to auctions as one factor in the similarity computation, at 350 in FIG. 3. While few, if any, online auction facilities use UPC codes currently, this feature may be added in the future. In one implementation, if a UPC code is unavailable for the model auction, or an auction in the candidate pool does not include a UPC code, the UPC matching function returns a zero value.

The value U contributes a very large positive value towards the overall score M if the auction's UPC code is in the same as a model auction's. Its contribution is zero if the UPC codes differ. For didactic purposes, assume the following example: In one example, a pair of Diesel Kratt Jeans size 32×32 would have a different UPC code than one of size 30×32, but for purposes of computing M, these might be considered identical items. In light of the foregoing, the UPC matching function, in one implementation, returns a value of 0 or 1000, where 0 corresponds to "no match," and 1000 is a large positive value chosen to bias the end result to "match" regardless of the other terms in the equation. It will be apparent to one skilled in the art that any large positive value could be used.

A.6. Calculation of Overall Matching Score

In one implementation, the similar auction identification system 40 aggregates one or more of the factors discussed above in assessing the similarity of a given auction to a model (355). In one implementation, each of the factors is weighted to reflect the relative importance of each factor to the identification of similar auctions, as discussed more fully below. The weighting factors can be based on heuristic evaluations of the similar auction identification system 40 and adjusted to achieve different identification behaviors, and therefore, is a matter of engineering and design choice. To review, the terms of the matching equation, in one implementation, can include one to a plurality of the following:

1) the keyword-matching probability T, $0 \leq T \leq 1$;
2) the seller-id match value S. $0 \leq S \leq 1$;
3) the category match value C, $-1000 \leq C \leq 0$;
4) the price range match value P; and
5) the UPC code match value U, $0 \leq U \leq 1000$.

In one implementation, the similar auction identification system 40 computes the score M of a given candidate auction as follows:

$$M = Tw_1 + Sw_2 + Cw_3 + Pw_4 + Uw_5$$

The weights $w_i$ can be assigned in a variety of ways, and it will be apparent to one skilled in the art that the weights can be used to bias the similarity score towards any of the computed values T, S, C, P, U. In one embodiment, weights are as follows: $w_1=4$, $w_2=1$, $w_3=1$, $w_4=4$, and $w_5=1$.

In the above-described embodiment, M is generally in the range from 0 to 10, except for the extreme cases of "category non-match", price non-match, and "UPC code match." In this embodiment, M is bounded by 10 in the following non-extreme cases:

category matches (C=1)

UPC code not present or doesn't match (U=0)

The similar auction identification system 40 then compares M to a predefined constant 'c' to determine similarity, at 360 in FIG. 3. If M≧c, the auction is deemed a match. The constant can be set higher, which will have the effect of increasing "false negatives" (rejecting auctions which really are similar) but reducing "false positives" (accepting auctions which are not similar). If the constant is set lower, false negatives will likely decrease, but false positives will increase. In one embodiment, 'c' is 8.0.

In an alternative embodiment of the invention, in order to do a more exact price match, similar auction identification system 40 omits the price matching as a factor for consideration during a first pass of the matching operations described herein. For example, the formula that is used to calculate M (the score of a given auction) to exclude P (the price range match value) can be changed to: $M=Tw_1+Sw_2+Cw_3+Uw_4$, where the weights are modified to: $w_1=7$, $w_{2=1}$, $W_3=1$, and $W_4=1$. The score M can then be used to determine whether a candidate auction on the list should be retained, without reference to the price match test P. The resulting list of candidate auctions, which has been refined somewhat, can be graphed as indicated above and a weighted average price over time can be determined. This information can be used to make a second pass through the data, determining whether each candidate auction on the narrowed list should be retained, or lies outside of the range of prices near the weighted average of items in the data set, as described above.

The resulting set of similar auctions 310 can then be used in a variety of manners. For example, the set of similar auctions 310 can be used as inputs to the auction optimization technologies disclosed in U.S. application Ser. Nos. 10/646,096 and 10/878,261. In another implementation, the set of similar auctions 310 can be merely displayed to the user to allow the user to gain a sense of the attributes of the auctions that are similar to a contemplated auction.

B. Exemplary Operating Environment and Operation

B.1. Network Environment

Figure 1:
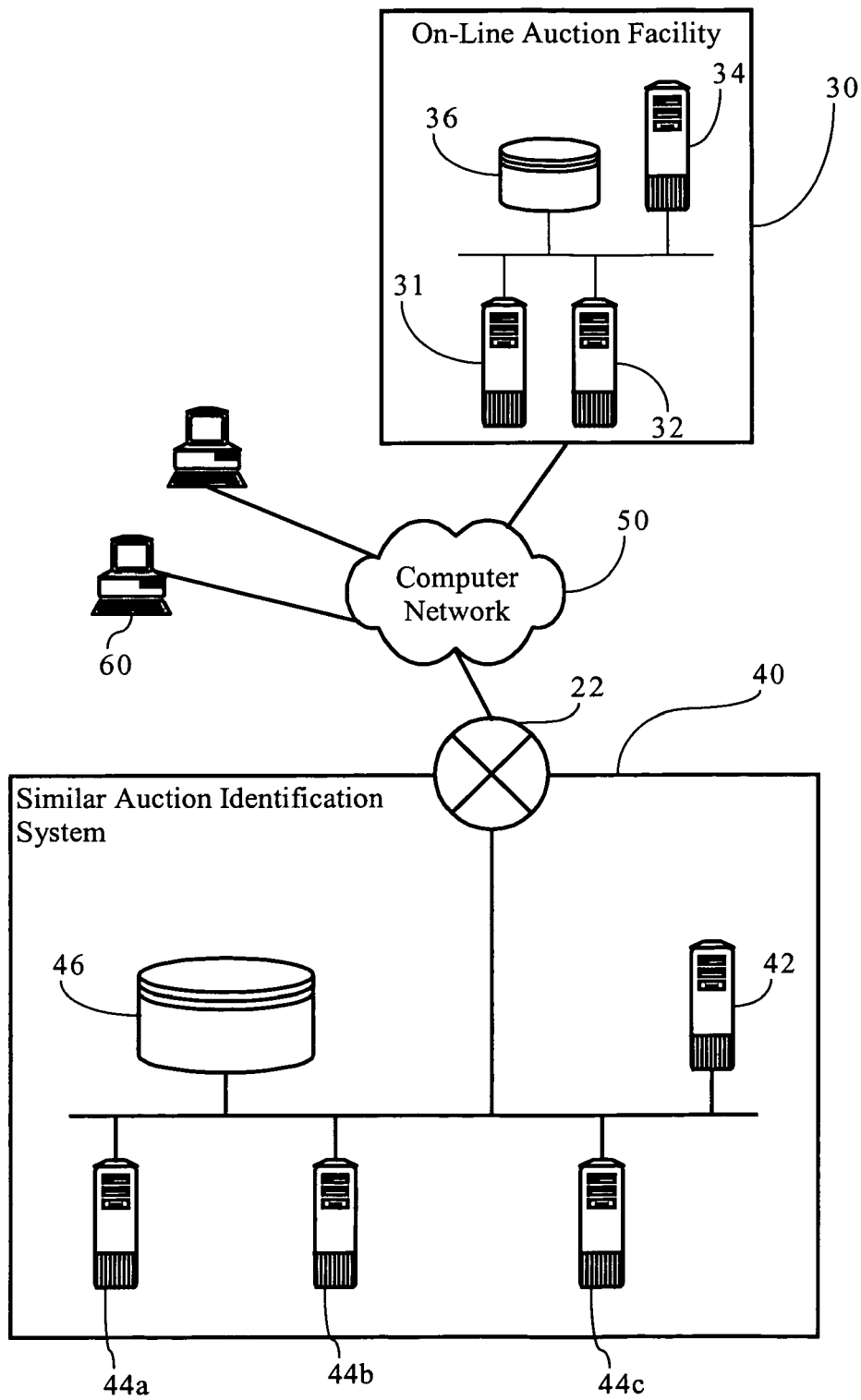
FIG. 1 is a functional block diagram illustrating a computer network environment in which an embodiment of the present invention operates.

FIG. 1 sets forth a computer network environment in which an embodiment of similar auction identification system 40 operates. As FIG. 1 shows, in one embodiment, the computer network environment includes similar auction identification system 40, at least one on-line auction facility 30, and at least one client computer 60. On-line auction facility 30 is a network-based auction facility, in one embodiment, comprising one or more of a number of types of front-end servers 31, application server 32, search server 34, and database server 36. Front-end servers 31, namely web servers 31 are operative to establish HTTP or other connections with client computers 60 and deliver web pages (e.g., markup language documents) in response to HTTP requests. Application servers 32 host auction-based functionality allowing users to, for example, establish accounts, post auctions and place bids in auctions. Search servers 34 handle search requests, allowing users to locate auctions for items of interest by specifying keywords or other search terms. Search servers 34 also allow users to view bid history data for past, completed auctions, as well. Database server 36 maintains user account data, as well as auction data for current and completed auctions. U.S. Pat. No. 6,466,917, which is incorporated by reference herein, discloses an auction facility suitable for use in connection with the present invention.

Users access on-line auction facility 30 with a client program, such as a browser (e.g., the Internet Explorer distributed by Microsoft Corp. of Redmond, Wash. that executes on a client machine 60 and accesses the facility 30 via a network such as, for example, the Internet 50). Other examples of networks that a client computer 60 may utilize to access the auction facility 10 include a wide area network (WAN), a local area network (LAN), a wireless network (e.g., a cellular network), or the Plain Old Telephone Service (POTS) network.

As FIG. 1 illustrates, similar auction identification system 40, in one embodiment, comprises authentication server 42, auction optimization application servers 44a, 44b, 44c, and data warehouse 46. In one embodiment, the functionality of similar auction identification system 40 is hosted by a data center with highly redundant Internet connectivity. As FIG. 1 shows, the local area network that interconnects the components of the similar auction identification system 40 is connected to the Internet 50 with router 22.

In one embodiment of similar auction identification system 40, the functional software components are divided up between machines or computing devices that are categorized three different ways (referred to here as "nodes"). In one embodiment, all of the machines generally have the same or similar configuration; in one embodiment, the machines are commodity PC-style server hardware, running the Linux operating system. In one embodiment, the web server technology employed is the Tomcat server provided by the Apache Jakarta project, and database used is the PostgreSQL database. The data warehouse 46 may be implemented on a larger-scale commercial database, such as Oracle, if scaling requires it. In one implementation, the functionality of similar auction identification system 40 may be implemented as a web service accessible to other systems and applications using standard protocols, such as SOAP, and the like.

Authentication server 42 is operative to authenticate users to allow access to similar auction identification system 40. Authentication server 42, in one embodiment, has a local database and web server. It services the initial incoming HTTP requests from users before they have logged in, authenticates the user with a username and password, and redirects the user to one of the application server nodes (e.g., 44a, 44b, 44c, etc.), where the primary work is done. Users are either distributed to a fixed node every time they log in, or are alternatively distributed using some load-balancing mechanism such as round-robin. The load on the authentication server 42 is limited because it only handles the initial requests from unauthenticated users, and therefore needs to only be able to scale to handle the number of new user logins that are occurring in the system at any given time.

The application server nodes 44a-c, in one embodiment, each also have local databases and web servers. These nodes, in one embodiment, perform the bulk of the auction optimization application activities (see below). Since users are expected to interact with the auction identification, or other related, application frequently, scalability is accomplished by adding additional identical application server nodes to the configuration, as required. The database on each application server node contains the private data of users, and local data that is kept in the operation of the application. Because this data is accessed very frequently, in one implementation, it is kept in a local database on the same node as the web server, to avoid round-trip time on the network accessing a remote database.

Figure 6:
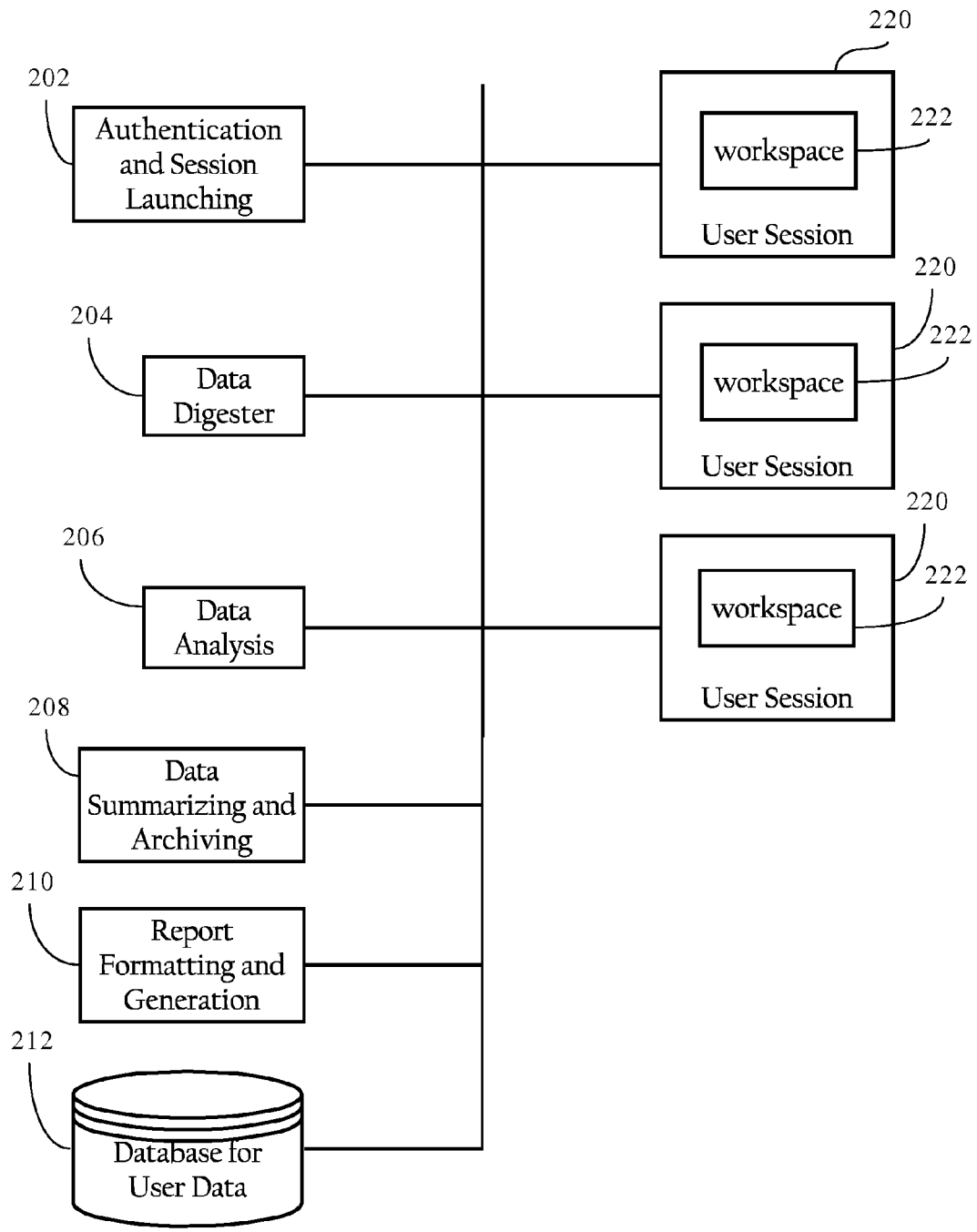
FIG. 6 is a functional block diagram illustration the functionality of an application server according to an embodiment of the present invention.

FIG. 6 provides a breakdown of certain functional components of an auction identification application server 44a-c, according to an embodiment of the present invention. As FIG.

1 illustrates, auction identification application servers 44*a*-cooperate in connection with other separate components, such as at least one authentication server 42 and a data warehouse 46. In other embodiments, however, the functionality of one or both of the authentication server 42 and the data warehouse may be integrated into the same physical device that hosts the functionality of auction identification application servers 44*a-c*.

As FIG. 6 illustrates, auction identification application server 44*a-c*, in one embodiment, includes authentication and session launching module 202, data digester 204, data analysis module 206, data summarizing and archiving module 208, and report formatting and generation module 210, and user database 212. Authentication and session launching module 202 creates sessions for new users, under control of the authentication server 42. The authentication and session launching module 202, in one embodiment, receives calls from the authentication server 42 indicating who is allowed to log in, and then allows sessions to be established for users who have been so identified. Note that, in one embodiment, when a user connects to the authentication server 42 to get access to the system, the authentication server 42 makes a call back to the authentication and session launching module 202 residing on the auction identification application server 44*a* to let it know that this user is allowed in. As FIG. 6 demonstrates, each user session 220 maintained in a memory contains a workspace 222, which in one embodiment, comprises a group of candidate auctions, retrieved from data warehouse 46 and/or on-line auction facility 30, being considered for analysis. Authentication and session launching module 202 also receives new connection requests, and displays the application's basic frame set on the user's web browser (with the top frame, tabs, and the lower frame which contains either application data or data from auction facility 30.) Session launching module 202 also handles logout requests, tears down sessions and notifies the authentication server 42 that the user session has ended.

Data digester 204 handles requests for queries of the data warehouse 46, and adds the data retrieved from the data warehouse to the current workspace 222. Data digester 204 also receives data from client computer 60 gathered by the applet residing thereon, and adds it to the workspace 222. In one embodiment, data digester 204 digests web pages, received by the applet executing on client computer 60 and transmitted to auction optimization application server 44*a*, into a form (with the HTML stripped out) that can be used by data analysis module 206, and/or inserted into the data warehouse 46, or into the application server's local database, for later transfer to the data warehouse 46. Data summarizing and archiving module 208, in one embodiment, calculates statistics and summary data from the auction data, and inserts the statistical and summary data into the data warehouse 46. Data summarizing and archiving module 208 also periodically transfers new data to the data warehouse 46 where it becomes available to other users.

Data analysis module 206 performs the similar auction identification analysis, described above, on the selected data in the workspace 222. As discussed above, in one embodiment, the user at client computer 60 within the context of the Auction Optimizer applet searches for relevant auction data maintained by on-line auction facility 30 and adds and removes auctions from the workspace 222 until the workspace 222 contains the desired set of auctions to be analyzed. To trigger the analysis, the user invokes the analysis function, causing the data analysis module 206 to operate on the auctions in the workspace 222. Report formatting and generation module 210 formats the analyzed data and generates the displayed set of similar auctions 310. The user may then view the set of similar auctions and invoke additional functionality that operates on the set of similar auctions, such as computing a set of suggested auction parameters for a contemplated auction.

B.2. Overall Process Flow

Figure 8:
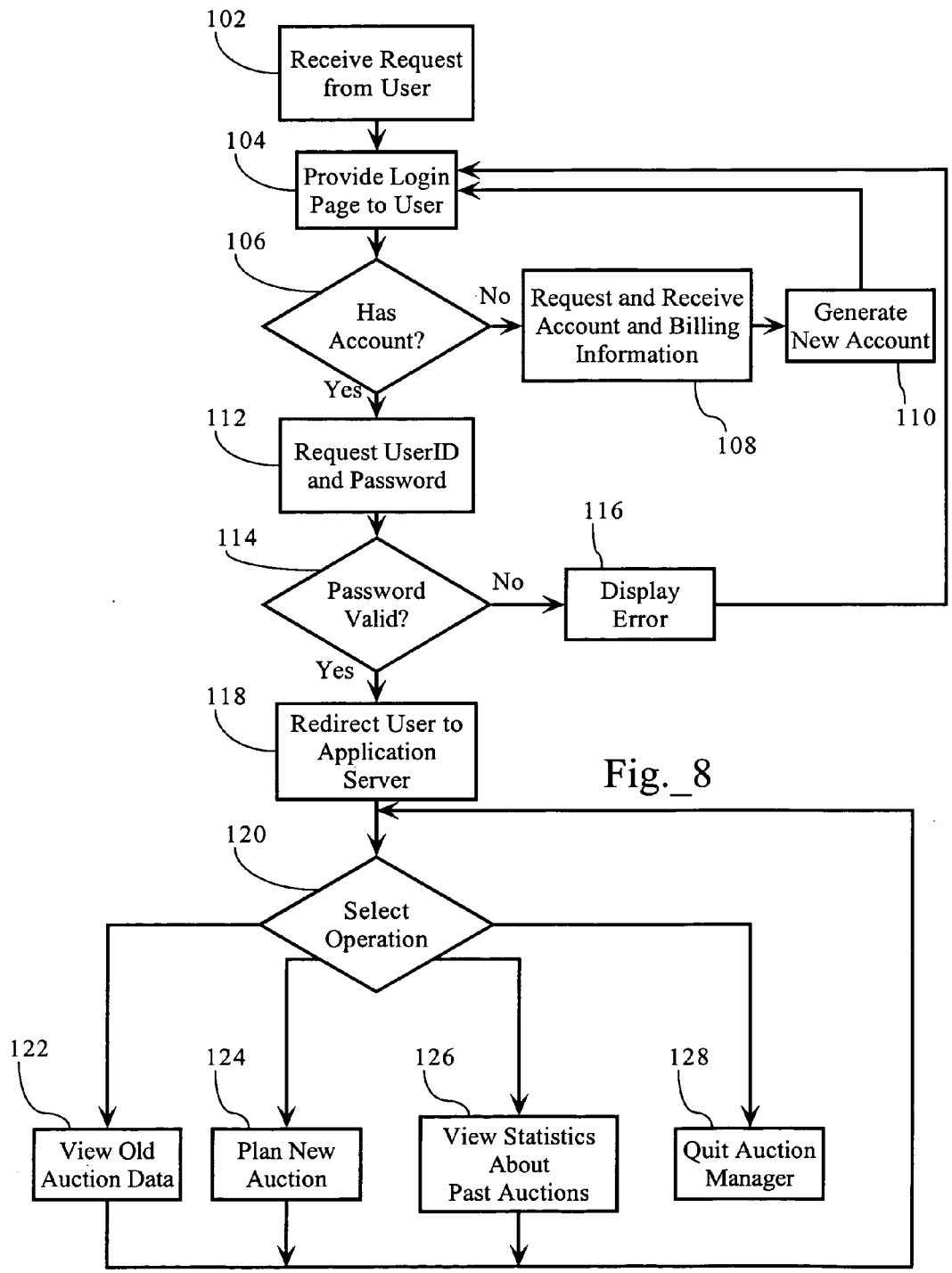
FIG. 8 is a flow chart diagram illustrating the overall process flow, according to an embodiment of the present invention.

FIG. 8 illustrates the overall process flow associated with an embodiment of similar auction identification system 40. In one embodiment, when similar auction identification system 40 receives an initial login request from the user (102), the user is redirected to authentication server 42 which provides a login page to the user (104). The login page queries the user for his or her user name and password, or invites the user to create a new account. If the user does not have an account, the user is prompted for account and billing information (108), such as a user name, password, billing address and credit card account information. Authentication server 42 generates a new account (110) and provides the login page to the user (104). If the user has an account, authentication server 42 queries the user for a user name and password (112). If the password is valid, authentication server 42 redirects the user to one of the application servers 44*a-c* (118). Otherwise, an error message is transmitted to the user (116), and the user is prompted to provide a user name and password again.

Once the user has been successfully authenticated, authentication server 42 redirects the user to the application server 44*a-c*, which, in one embodiment, offers one of four major operations:

1) View old auction data (122): From this screen, the user may review data about auctions that have been previously saved away. This option provides the user with longer-term storage for information about old auctions. Auction web sites typically expire information about old auctions after a relatively short period of time, after which it is no longer accessible.

2) Plan a new auction (124): This is the bulk of the functionality of the similar auction identification system 40, the operation of which is described in more detail herein.

3) View statistics about old auctions (126): From this screen, the user may review the following information about their own previous auctions that they have carried out after consulting the Auction optimization tool: a) Values recommended by the Auction optimization tool for price, duration, buy-it-now price, reserve, etc.; b) Values actually entered by the user in the auction; and c) Final results of the auction.

4) Quit the application (128): By selecting this option, the user logs out of the system.

B.3. Planning New Auction Process Flow

Figure 7:
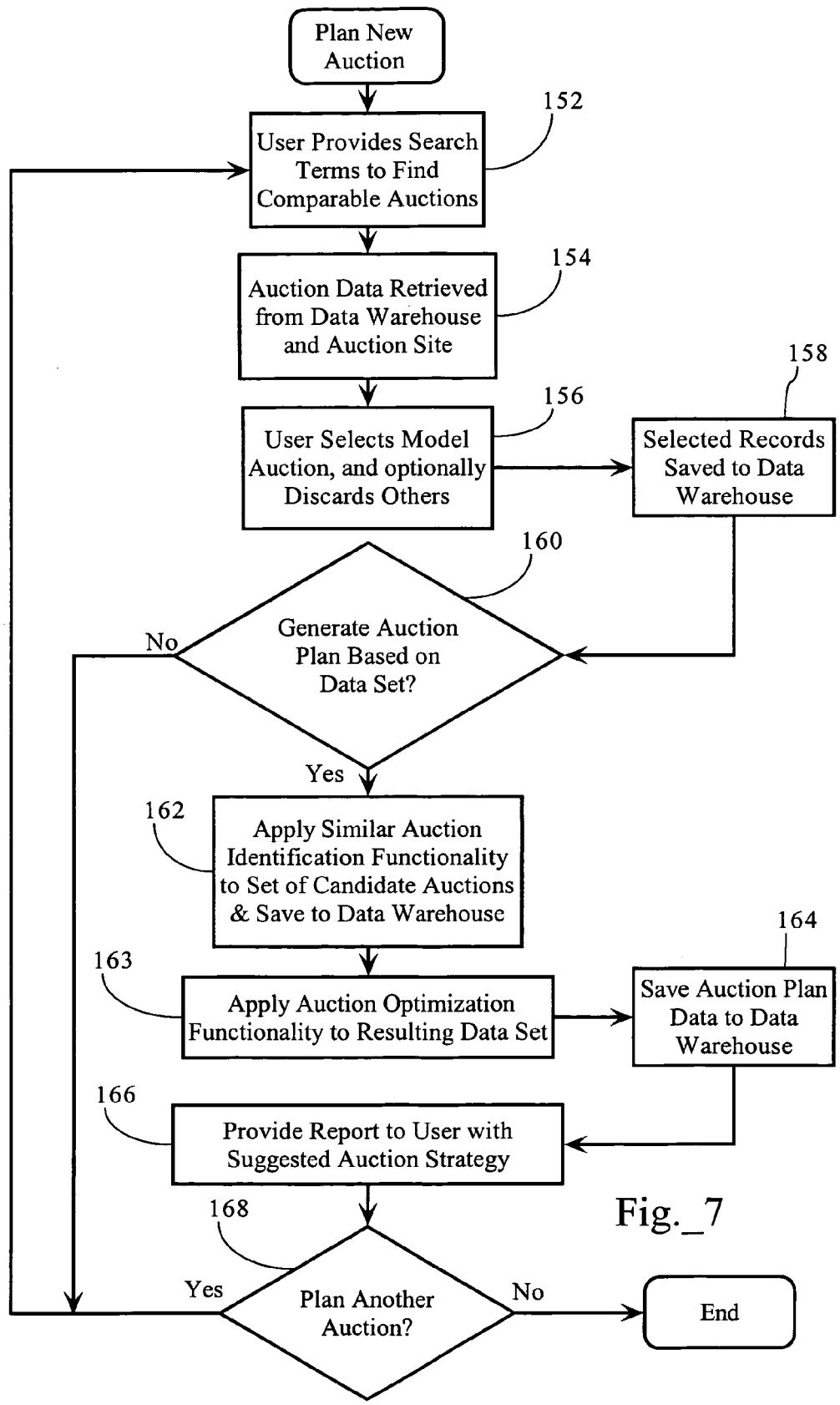
FIG. 7 is a flow chart diagram showing the process flow, according to an embodiment of the present invention, associated with planning a new auction.

FIG. 7 illustrates the overall process flow associated with planning a new auction using similar auction identification system 40, as well as the auction optimization functionality disclosed in U.S. application Ser. Nos. 10/646,096 and 10/878,261. In one embodiment, most of the processing occurs on one of the application server 44*a-c*; however, some processing occurs at the data warehouse 46, such as saving auction data and the data generated when an auction is planned.

As FIG. 7 shows, the user, in one implementation, first provides keyword search terms, such as keywords, to find auction data for completed and currently pending auctions for items that are the same as, and/or comparable to, the item the user plans to auction (152). On-line auction facility 30 maintains a plurality of pending auctions and also stores past completed auctions going back a given period of time. As discussed more fully below, this past and present auction data is gathered and provided to similar auction identification system 40 using one to a plurality of data gathering methods described below. In one embodiment, after the user has specified search terms, similar auction identification system 40 retrieves auction data matching the search terms from data warehouse 46 and on-line auction facility 30 (154).

Similar auction identification system 40, in one embodiment, displays a list of the retrieved auction records to the user and allows the user to select a model auction and, optionally, de-select any auctions that are not applicable to the item(s) the user desires to sell (156). The user, in one embodiment, clicks on a "selection complete" button causing the user's browser to transmit the selected auctions to similar auction identification system 40. In one embodiment, the auction data corresponding to the selected auctions is saved to data warehouse 46 (158) and is available during subsequent searches to other users. As FIG. 7 illustrates, the user is then provided the option of operating on the set of auctions to identify the auctions that are similar to the model auction (162), as well as generating an auction plan based on the set of similar auctions (163), or to re-specify search terms to find more or alternative auctions.

If the user wishes to generate an auction plan based on the retrieved data set, similar auction identification system 40, first generates the set of similar auctions as discussed above (saving the set in data warehouse 46) (162), and then applies the auction optimization functionality described in U.S. application Ser. Nos. 10/646,096 and 10/878,261 to generate an auction plan based on the data set (163). In one implementation the auction plan is saved to the data warehouse 46 (164). Similar auction identification system 40 then provides a report including the auction plan to the user (166). As disclosed in the above-identified patent applications, the report, in one embodiment, includes a predicted final auction price, a suggested starting price, as well as other suggested auction parameters as described more fully in other sections. As FIG. 7 provides, the user may then opt to generate another auction plan, or exit the auction planning aspect of the system and return to the main menu (168). With the report, according to one embodiment, the user accesses on-line auction facility 30 directly and posts an auction using the suggested auction parameters as the user desires. In another implementation, the downloaded page including the report contains Javascript or a Java applet that allows the user to click on a button and have the auction automatically posted to on-line auction facility 30. In such an embodiment, the user account information stored with each user includes the user name and password corresponding to the user's account with on-line auction facility 30.

B.4. Auction Data Acquisition

A variety of technologies and methodologies can be employed to gather auction data from one to a plurality of on-line auction facilities 30. In one embodiment, similar auction identification system 40 can receive auction data directly from on or more on-line auction facilities 30 on a periodic basis. For example and in one embodiment, on-line auction facility 30, pursuant to an arrangement with similar auction identification system 40, transmits bid history and other data associated with completed auctions during a nightly batch process for example. In such as embodiment, similar auction identification system 40 stores the auction data in data warehouse 46 for use by users in searching for and selecting suitable auction data for analysis and development of an auction plan.

In another embodiment, similar auction identification system 40 can employ a crawler, spider or bot to gather auction information and store it in data warehouse 46. In such an embodiment, the crawler can search for completed auctions for items commonly sold on on-line auction facility 30, such as cars, motorcycles, electronics, collectibles, and the like. In one embodiment, this crawler can execute on a regular, periodic basis and adhering to the rules specified in the Standard for Robot Exclusion (SRE). In another embodiment, the crawler can operate to crawl a plurality of on-line auction facilities to gather completed and pending auction data on-demand in response to a user request. For example, a user may specify search terms or select from one or more pull-down menus to specify an item to be auctioned. The crawler may then operate to return completed and pending auction data based on the search terms or specified item. In addition, as discussed above, the data warehouse 46, in one embodiment, is also searched with the same keywords or specified item. The data warehouse 46 may contain auction information that is substantially older than the information that is available from the auction web site.

In an alternative implementation, the user, at client computer 60, may query the on-line auction facility 30 directly, and transfer the auction data retrieved to similar auction identification system 40, for example by saving the data to a file and transferring the data, or by using a Javascript utility which reads information from the frame in the web browser containing the data, and writing it into the frame containing the user interface associated with similar auction identification system 40, as described more fully below.

In one embodiment, similar auction identification system 40 acquires auction data for subsequent analysis in a manner that satisfies the following two requirements:

1) The data must be downloaded on the user's direct request—similar auction identification system 40 does not automatically crawl on-line auction facility 30 from the application server 44*a-c*. This ensures that excessive requests will not be generated to on-line auction facility 30 and that the data maintained by on-line auction facility is being used in accordance with the intent of most data use policies—i.e., to provide it directly to their subscribers for their own use.

2) The download of the necessary data for analysis is accomplished in a way that integrates well with the user's normal experience of using the on-line auction facility 30. In one embodiment, users are not be required to run a separate application, or manipulate multiple browser windows, to gather auction data.

To achieve the foregoing objectives, similar auction identification system 40 utilizes client-side functionality on client computer 60 to gather auction data in a manner consistent with normal use of on-line auction facility 30, as disclosed in U.S. application Ser. Nos. 10/646,096 and 10/878,261.

Although the present invention has been described relative to specific embodiments, it is not so limited. Many modifications and variations of the embodiments described above will become apparent. For example, although the similar auction identification system 40 has been described as using specific constant values, the constant values can be varied to achieve a variety of behaviors and objectives. In addition, the specific, individual factor weightings described above are only one of many possible factor weightings. Furthermore, other changes in the details, steps and arrangement of various elements may be made by those of ordinary skill in the art without departing from the scope of the present invention. For example, the functionality of similar auction identification system 40 may be integrated into, and be a part of, the functionality of on-line auction facility 30. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. A method facilitating the identification of similar auctions, comprising:

receiving a set of keywords relating to an auction;

searching, based on the set of keywords, a database of auction objects each containing at least one word, to identify a first set of auction objects;

identifying a model auction;

for at least one auction object in the first set of auction objects, determining the probability that the at least one auction object is similar to the model auction based, at least in part, on distinctiveness of the keywords in the set of keywords relative to the words in the first set of auction objects, and corresponding position weightings based on positions of the keywords relative to the other words contained in each auction for the first set of auction objects, wherein the distinctiveness of a keyword in the set of keywords is determined by computing a value D, where $$D(Ki) = 1 - \frac{\phi(E(M, Ki))}{\phi(M)},$$

and wherein

M represents the first set of auctions;

K represents the set of keywords;

$K_i$ is an element in the keyword set K such that $K_i \in K$;

$E(M, K_i)$ is a function that returns a set of auctions in M such that each returned auction contains the keyword $K_i$; and $\phi(X)$ is a function that returns the total number of elements in the set X, except the empty set;

wherein the position weighting of a keyword in the set of keywords is determined by computing a value G, where $$G(Ki) = f\left(\frac{\text{Position}(W, Ki)}{N}\right),$$

and wherein

W represents a description of an auction $M_i \in M$ where W has been reduced to a set of meaningful keywords;

N represents the total number of words in W,

Position(W,$K_i$) returns the position of the first occurrence of keyword $K_i$ in W starting from the beginning position of W, or a zero value if the keyword $K_i$ is not found in W;

F(x) is a function where x ranges from 0 to 1, f(x) ranges from 0 to 1, and f(0)=1 and f(x) decays to 0 as x approaches 1;

wherein the determining step further comprises computing, for the at least one auction, the difference between 1) the sum of the products of the distinctiveness and the position weightings for each keyword in the set of keywords, and 2) the sum of the products of the distinctiveness and the position weight for each word in the union of all remaining words in the first set of auction objects.

2. The method of claim 1 wherein the determining step further comprises normalizing the difference obtained in the computing step to a value bounded by a range of values.

3. The method of claim 2 wherein the determining step further comprises comparing the normalized difference to a threshold value.

4. The method of claim 1 wherein each auction object in the first set of auction objects contains at least one keyword in the set of keywords.

5. The method of claim 1 wherein the model auction is selected from the first set of auction objects.

6. The method of claim 1 wherein the set of keywords in the receiving received set of keywords is extracted from the model auction.

7. The method of claim 1 wherein the received set of keywords is specified by a user.

8. The method of claim 1 wherein each auction object in the first set of auction objects includes a corresponding auction category identifier, and wherein the determining step further comprises comparing the category identifier corresponding to the model auction with the seller category identifier corresponding to the at least one auction object.

9. The method of claim 1 wherein each auction object in the first set of auction objects includes a corresponding seller identifier, and wherein the determining step further comprises comparing the seller identifier corresponding to the model auction with the seller identifier corresponding to the at least one auction object.

10. The method of claim 1 wherein each auction object in the first set of auction objects includes a corresponding UPC identifier, and wherein the determining step further comprises comparing the UPC identifier corresponding to the model auction with the UPC identifier corresponding to the at least one auction object.

11. The method of claim 1 further comprising receiving historical auction data characterizing the auction objects in the first set of auction objects;

weighting the final auction price of each completed auction in the first set of auction objects based on at least one auction attribute associated with the auction object, generating a model of the weighted auction prices as a function of time by aggregating the weighted final auctions according to corresponding time periods; and comparing at least one auction object in the set of first set of auction objects to the model.

12. The method of claim 11 further comprising excluding auction objects from the first set of auction objects where the corresponding weighted price is beyond a threshold distance from the model.

13. The method of claim 11 further comprising computing a price match value for at least one auction object from the first set of auction objects by scoring the degree to which the corresponding weighted price matches the model.

14. A method facilitating the identification of similar auctions, comprising:

receiving a set of keywords relating to an auction;

searching, based on the set of keywords, a database of auction objects each containing at least one word, to identify a first set of auction objects;

identifying a model auction from the first set of auctions;

for at least one auction object in the first set of auction objects, determining the probability that the at least one auction object is similar to the model auction, wherein the determining step comprises computing, for a given auction, a keyword matching value characterizing the difference between 1) a sum of the products of a distinctiveness degree and a position weighting for each keyword in the set of keywords, and 2) a sum of the products of a distinctiveness degree and a position weighting for each word in the union of all remaining words in the auction objects;

wherein the distinctiveness of a keyword in the set of keywords is determined by computing a value D, where $$D(Ki) = 1 - \frac{\phi(E(M, Ki))}{\phi(M)},$$

and wherein

M represents the first set of auctions;

K represents the set of keywords;

$K_i$ is an element in the keyword set K such that $K_i \in K$;

$E(M, K_i)$ is a function that returns a set of auctions in M such that each returned auction contains the keyword $K_i$; and $\phi(X)$ is a function that returns the total number of elements in the set X, except the empty set;

wherein the position weighting of a keyword in the set of keywords is determined by computing a value G, where $$G(Ki) = f\left(\frac{\text{Position}(W, Ki)}{N}\right),$$

and wherein

W represents a description of an auction $M_i \in M$ where W has been reduced to a set of meaningful keywords;

N represents the total number of words in W;

Position(W,$K_i$) returns the position of the first occurrence of keyword $K_i$ in W starting from the beginning position of W, or a zero value if the keyword $K_i$ is not found in W;

F(x) is a function where x ranges from 0 to 1, f(x) ranges from 0 to 1, and f(0)=1 and f(x) decays to 0 as x approaches 1.

15. The method of claim 14 wherein the determining step further comprises normalizing the keyword matching value based on the keyword matching values corresponding to all other auction objects in the first set of auction objects.

16. The method of claim 15 wherein each auction in the first set of auction objects includes a corresponding auction category identifier, and wherein the determining step further comprises computing a category match score based on the degree of matching between the category identifier corresponding to the model auction with the seller category identifier corresponding to the at least one auction object.

17. The method of claim 15 wherein each auction in the first set of auction objects includes a corresponding seller identifier, and wherein the determining step further comprises computing a seller identification match score based on a comparison of the seller identifier corresponding to the model auction with the seller identifier corresponding to the at least one auction object.

18. The method of claim 15 wherein each auction object in the first set of auction objects includes a corresponding UPC identifier, and wherein the determining step further comprises computing a UPC match score based on a comparison of the UPC identifier corresponding to the model auction with the UPC identifier corresponding to the at least one auction object.

19. The method of claim 16 further comprising computing an overall matching score by aggregating the keyword matching value and the category match score for the at least one auction object;

comparing the overall matching score to a threshold overall match score value.

20. The method of claim 19 wherein the keyword matching value and the category match score are weighted.

21. A computer readable medium storing a software application comprising instructions to perform the steps of:

storing a set of keywords relating to an auction in the memory;

searching, based on the set of keywords, a database of auction objects each containing at least one word, to identify a first set of auction objects;

storing an identification of a model auction;

determining, for at least one auction object in the first set of auction objects, the probability that the at least one auction object is similar to the model auction by:

computing, for a given auction, a keyword matching value characterizing the difference between 1) a sum of the products of a distinctiveness degree and a position weighting for each keyword in the set of keywords, and 2) a sum of the products of a distinctiveness degree and a position weighting for each word in the union of all remaining words in the auction objects;

wherein the distinctiveness of a keyword in the set of keywords is determined by computing a value D, where $$D(Ki) = 1 - \frac{\phi(E(M, Ki))}{\phi(M)},$$

and wherein

M represents the first set of auctions;

K represents the set of keywords;

$K_i$ is an element in the keyword set K such that $K_i \in K$;

$E(M, K_i)$ is a function that returns a set of auctions in M such that each returned auction contains the keyword $K_i$; and $\phi(X)$ is a function that returns the total number of elements in the set X, except the empty set;

wherein the position weighting of a keyword in the set of keywords is determined by computing a value G, where $$G(Ki) = f\left(\frac{\text{Position}(W, Ki)}{N}\right),$$

and wherein

W represents a description of an auction $M_i \in M$ where W has been reduced to a set of meaningful keywords;

N represents the total number of words in W;

Position(W,$K_i$) returns the position of the first occurrence of keyword $K_i$ in W starting from the beginning position of W, or a zero value if the keyword $K_i$ is not found in W;

F(x) is a function where x ranges from 0 to 1, f(x) ranges from 0 to 1, and f(0)=1 and f(x) decays to 0 as x approaches 1.

22. An apparatus facilitating the identification of similar auctions, comprising:

a processor;

a memory;

a software application, physically stored in the memory, comprising instructions operable to cause the processor and the apparatus to:

store a set of keywords relating to an auction in the memory;

search, based on the set of keywords, a database of auction objects each containing at least one word, to identify a first set of auction objects;

store an identification of a model auction;

determine, for at least one auction object in the first set of auction objects, the probability that the at least one auction object is similar to the model auction by:

computing, for a given auction, a keyword matching value characterizing the difference between 1) a sum of the products of a distinctiveness degree and a position weighting for each keyword in the set of keywords, and 2) a sum of the products of a distinctiveness degree and a position weighting for each word in the union of all remaining words in the auction objects;

wherein the distinctiveness of a keyword in the set of keywords is determined by computing a value D, where $$D(Ki) = 1 - \frac{\phi(E(M, Ki))}{\phi(M)},$$

and wherein

M represents the first set of auctions;

K represents the set of keywords;

$K_i$ is an element in the keyword set K such that $K_i \epsilon K$;

$E(M, K_i)$ is a function that returns a set of auctions in M such that each returned auction contains the keyword $K_i$; and $\phi(X)$ is a function that returns the total number of elements in the set X, except the empty set;

wherein the position weighting of a keyword in the set of keywords is determined by computing a value G, where $$G(Ki) = f\left(\frac{Position(W, Ki)}{N}\right),$$

and wherein

W represents a description of an auction $M_i \epsilon M$ where W has been reduced to a set of meaningful keywords;

N represents the total number of words in W;

$Position(W, K_i)$ returns the position of the first occurrence of keyword $K_i$ in W starting from the beginning position of W, or a zero value if the keyword $K_i$ is not found in W;

F(x) is a function where x ranges from 0 to 1, f(x) ranges from 0 to 1, and f(0)=1 and f(x) decays to 0 as x approaches 1.

* * * * *